US012291427B2

(12) United States Patent
Kou et al.

(10) Patent No.: US 12,291,427 B2
(45) Date of Patent: May 6, 2025

(54) ROPE REPLACEMENT APPARATUS

(71) Applicants: TAIYUAN UNIVERSITY OF TECHNOLOGY, Shanxi (CN); TAIYUAN BOSHITONG MACHINERY, ELECTRICITY AND HYDRAULIC ENGINEERING CO., LTD., Shanxi (CN)

(72) Inventors: Ziming Kou, Taiyuan (CN); Juan Wu, Taiyuan (CN); Yandong Wang, Taiyuan (CN); Aiming Cheng, Taiyuan (CN); Jiabao Xue, Taiyuan (CN); Zhigang Li, Taiyuan (CN); Jun Yang, Taiyuan (CN); Xinyu Shen, Taiyuan (CN)

(73) Assignees: TAIYUAN UNIVERSITY OF TECHNOLOGY, Shanxi (CN); TAIYUAN BOSHITONG MACHINERY, ELECTRICITY AND HYDRAULIC ENGINEERING CO., LTD., Shanxi (CN)

( * ) Notice: Subject to any disclaimer, the term of this patent is extended or adjusted under 35 U.S.C. 154(b) by 0 days.

(21) Appl. No.: 18/715,069

(22) PCT Filed: Feb. 8, 2023

(86) PCT No.: PCT/CN2023/075035

§ 371 (c)(1),
(2) Date: May 30, 2024

(87) PCT Pub. No.: WO2023/104221

PCT Pub. Date: Jun. 15, 2023

(65) Prior Publication Data

US 2024/0425324 A1 Dec. 26, 2024

(51) Int. Cl.

| | |
|---|---|
| ***B66B 19/02*** | (2006.01) |
| ***B65H 51/14*** | (2006.01) |

(52) U.S. Cl.

CPC ............ *B66B 19/02* (2013.01); *B65H 51/14* (2013.01); *B65H 2403/7251* (2013.01); (Continued)

(58) Field of Classification Search

CPC ................................ B66B 19/02; B65H 51/12

See application file for complete search history.

(56) References Cited

FOREIGN PATENT DOCUMENTS

| | | |
|---|---|---|
| CN | 1597491 A | 3/2005 |
| CN | 201457370 U | 5/2010 |

(Continued)

OTHER PUBLICATIONS

Machine Translation of CN 106429177.*

(Continued)

*Primary Examiner* — Diem M Tran

(74) *Attorney, Agent, or Firm* — SYNCODA LLC; Feng Ma

(57) ABSTRACT

A rope replacement apparatus includes: a rope conveying mechanism, used for driving a first rope to move along a moving path of a second rope, so as to replace the second rope; a first detection part, used for detecting a first moving speed $V_1$ of the first rope output by the rope conveying mechanism; the first detection part being installed on the rope conveying mechanism; a second detection part, used for detecting a second moving speed $V_2$ of the second rope outside the rope conveying mechanism; the second detection part being installed on the moving path of the second rope; a control part, used for adjusting $V_1$ according to the difference between $V_1$ and $V_2$; the first detection part and the second detection part being both in communication connection with the control part. The rope replacement apparatus improves rope replacement efficiency and slipping can be reduced.

8 Claims, 4 Drawing Sheets

(52) U.S. Cl.
CPC ...... *B65H 2513/10* (2013.01); *B65H 2553/51* (2013.01); *B65H 2557/264* (2013.01); *B65H 2701/35* (2013.01)

(56) References Cited

FOREIGN PATENT DOCUMENTS

| | | | |
|---|---|---|---|
| CN | 101759085 | A | 6/2010 |
| CN | 102303803 | A | 1/2012 |
| CN | 102530694 | A | 7/2012 |
| CN | 202744154 | U | 2/2013 |
| CN | 106241580 | A | 12/2016 |
| CN | 106429177 | A | 2/2017 |
| CN | 107651546 | A | 2/2018 |
| CN | 108394800 | A | 8/2018 |
| CN | 109231047 | A | 1/2019 |
| CN | 208856732 | U | 5/2019 |
| CN | 109911748 | A | 6/2019 |
| CN | 212716734 | U | 3/2021 |
| CN | 113353771 | A | 9/2021 |
| CN | 214692832 | U | 11/2021 |
| CN | 114408714 | A | 4/2022 |
| GB | 1228011 | A | 4/1971 |
| JP | 2020121865 | A | 8/2020 |

OTHER PUBLICATIONS

International Search Report in the international application No. PCT/CN2023/075035, mailed on May 30, 2023. 7 pages with English translation.
First Office Action of the Chinese application No. 202111497804.3, issued on Dec. 21, 2023. 16 pages with English translation.
Notice of Allowance of the Chinese application No. 202111497804.3, issued on Mar. 14, 2024. 3 pages with English translation. (with Allowed claims).

* cited by examiner

ROPE REPLACEMENT APPARATUS

CROSS-REFERENCE TO RELATED APPLICATIONS

This is a National Stage of International Application No. PCT/CN2023/075035 filed on Feb. 8, 2023, which claims priority to Chinese Patent Application No. 202111497804.3, filed on Dec. 9, 2021. The disclosures of the above-referenced applications are hereby incorporated by reference in their entirety.

TECHNICAL FIELD

The present disclosure relates to the technical field of a hoist, in particular to a rope replacement apparatus.

BACKGROUND

A mine hoisting system is an important device in a coal production process. The mine hoisting system undertakes the transportation task of mine coal, gangue, personnel, various materials and devices, which is an important channel for connecting underground and ground, and thus is often called as "throat" or "artery" by people. During use, the strength of a hoisting steel wire rope of the mine hoisting system will gradually decrease due to wire breaking, wear, corrosion and the like, thus, a service life is stipulated. For example, it is stipulated in the "Coal Mine Safety Regulations" that the service life of a main hoisting steel wire rope (head rope) of a shaft friction wheel hoist should not exceed two years, which means that replacement of a shaft hoist steel wire rope is relatively frequent. In large coal mines, the number of shaft hoists is large, resulting in a heavy workload and a long time for rope replacement. Thus, a safe and efficient rope replacement apparatus will bring great economic benefits to the coal mines. The commonly used rope replacement method is to use a rope replacement cart to achieve a linear pulling and pushing movement of the steel wire rope under a clamping effect of an upper clamping assembly and a lower clamping assembly which are arranged opposite to each other.

However, in the rope replacement process, a slipping phenomenon often occurs to the rope replacement cart, resulting in low efficiency of rope replacement and damage to related device and new ropes.

SUMMARY

In view of this, an embodiment of the present disclosure provides a rope replacement apparatus, which may reduce the slipping phenomenon.

In order to achieve the above purpose, a technical solution of the embodiment of the present disclosure is achieved as follows.

The embodiment of the present disclosure provides a rope replacement apparatus. The rope replacement apparatus includes: a rope conveying mechanism, a first detection component, a second detection component, and a control component.

The rope conveying mechanism is configured to drive a first rope to move along a moving path of a second rope to replace the second rope.

The first detection component is configured to detect a first movement speed $V_1$ of the first rope output by the rope conveying mechanism, and the first detection component is mounted on the rope conveying mechanism.

The second detection component is configured to detect a second movement speed $V_2$ of the second rope located outside the rope conveying mechanism, and the second detection component is mounted on the moving path of the second rope.

The control component is configured to adjust the $V_1$ according to a difference between the $V_1$ and the $V_2$, and each of the first detection component and the second detection component is in communication connection with the control component.

In the above solution, the rope conveying mechanism includes: a first clamping assembly, a second clamping assembly, and a clamping hydraulic cylinder.

Each of the first clamping assembly and the second clamping assembly includes a clamping belt configured to clamp the first rope, and a driving roller configured to drive the clamping belt into rotation. The clamping belt of the first clamping assembly is provided on one side of the first rope, and the clamping belt of the second clamping assembly is provided on another side of the first rope, to clamp the first rope.

The clamping hydraulic cylinder is connected to the driving roller of the first clamping assembly to drive the clamping belt of the first clamping assembly to move towards the clamping belt of the second clamping assembly, to clamp the first rope.

In the above solution, the clamping belt is provided with a plurality of friction blocks distributed in a circumferential direction. Each of the plurality of friction blocks is provided with a groove for passage of the first rope.

In the above solution, each of the plurality of friction blocks includes a base and a friction plate. The friction plate is removably fixed to the base, and the friction plate is provided with the groove for passage of the first rope.

In the above solution, the rope conveying mechanism further includes a brake assembly configured to stop movement of the first rope. The brake assembly includes: at least two brake pads, a brake spring, and an energy storage hydraulic cylinder.

The at least two brake pads are located on both sides of the first rope and are configured to close for braking the first rope.

The brake spring is abutted against a respective one of the at least two brake pads to press the at least two brake pads to close.

The energy storage hydraulic cylinder is configured to separate the at least two brake pads from each other to release the braking, and to compress the brake spring for energy storage.

In the above solution, the rope conveying mechanism further includes a rack.

The second clamping assembly is fixedly connected to the rack, and the first clamping assembly is movably connected to the rack.

An extension direction of the rack is consistent with a movement direction of the first rope, and the brake assembly is located at any one end in the extension direction of the rack.

In the above solution, the first detection component includes a first encoder and a first processor, the first encoder and the first processor being in communication connection with each other. The first encoder is configured to detect a first rotational speed $R_1$ of the driving roller, and the first processor is configured to convert the first rotational speed $R_1$ measured by the first encoder into the first movement speed $V_1$.

In the above solution, the second detection component includes a second encoder and a second processor, the second encoder and the second processor being in communication connection with each other. The second encoder is configured to detect a second rotational speed $R_2$ of a head sheave on the moving path of the second rope, and the second processor is configured to convert the second rotational speed $R_2$ measured by the second encoder into the second movement speed $V_2$.

In the above solution, the rope conveying mechanism further includes a crawler travelling mechanism. The crawler travelling mechanism is mounted below the rack, and is configured to adjust a distance between the rope conveying mechanism and a hoist.

In the above solution, the first encoder is in wireless communication connection with the first processor, and the first processor is in wireless communication connection with the control component. The second encoder is in wireless communication connection with the second processor, and the second processor is in wireless communication connection with the control component.

The embodiment of the present disclosure provides a rope replacement apparatus, which includes a rope conveying mechanism, a first detection component, a second detection component, and a control component. The first detection component is configured to detect a first movement speed $V_1$ of a first rope output by the rope conveying mechanism. The second detection component is configured to detect a second movement speed $V_2$ of a second rope located outside the rope conveying mechanism. The control component is configured to adjust the $V_1$ according to a difference between the $V_1$ and the $V_2$. The rope replacement apparatus according to the embodiment of the present disclosure is configured to adjust the first movement speed $V_1$ of the first rope output by the rope conveying mechanism according the difference between the $V_1$ and the $V_2$ by the control component, so that the movement speed of the first rope may match with the movement speed of the second rope located outside the rope conveying mechanism, which may facilitate a smooth replacement of the second rope with the first rope and reduce the slipping phenomenon in the rope replacement process, thereby improving the efficiency of rope replacement, reducing damage to the device and the new ropes, and improving the quality of rope replacement.

BRIEF DESCRIPTION OF THE DRAWINGS

In order to describe the technical solution in the embodiments of the present disclosure more clearly, the accompanying drawings required to be used in the embodiment description will be simply introduced below. It should be understood that the accompanying drawings in the following description are merely part of accompanying drawings of the embodiments of the present disclosure, and persons of ordinary skill in the art may still derive other accompanying drawings from these accompanying drawings without creative effort.

DESCRIPTION OF REFERENCE NUMERALS

Figure 1:
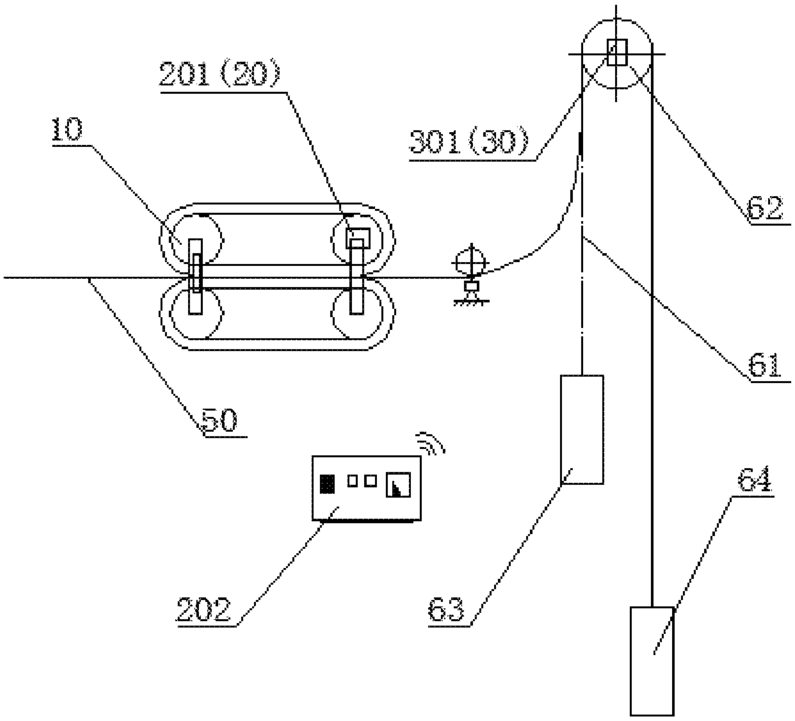
FIG. 1 is a schematic diagram of a rope replacement apparatus operating in a mine hoisting system according to an embodiment of the present disclosure.

10. Rope conveying mechanism; 11. First clamping assembly; 111. Clamping belt; 112. Driving roller; 113. Friction block; 1131. Base; 1132. Friction plate; 12. Second clamping assembly; 13. Clamping hydraulic cylinder; 14. Brake assembly; 141. Brake pad; 1411. Upper brake pad; 1412. Lower brake pad; 142. Brake spring; 143. Energy storage hydraulic cylinder; 1431. Piston portion; 15. Rack; 16. Guide pulley; 17. Crawler travelling mechanism; 20. First detection component; 201. First encoder; 202. Server; 30. Second detection component; 301: Second encoder; 50. First rope; 61. Second rope; 62. Head sheave; 63. First hoisting container; 64. Second hoisting container.

DETAILED DESCRIPTION

The present disclosure is further described in detail below in combination with the accompanying drawings and specific embodiments. It should be understood that the specific embodiments described here are merely used to explain the present disclosure but not intended to limit the present disclosure. In addition, the embodiments described below are merely some rather than all of the embodiments of the present disclosure. All other embodiments obtained by a person of ordinary skill in the art based on these embodiments without creative efforts shall fall within the protection scope of the present disclosure. The various specific technical features described in the specific embodiments can be combined in any suitable way, without contradiction, for example, the combination of different specific technical features may form different embodiments and technical solutions. In order to avoid unnecessary repetition, various possible combinations of the various specific technical features in the present disclosure will not be explained separately.

In the following description, the terms "first/second . . . " are only used to distinguish different objects, without indicating similarities or connections between these objects. It should be understood that the orientation descriptions "above", "below", "outer", and "inner" are all orientations in the normal use state. The "left" and "right" directions represent the left and right directions indicated in the corresponding schematic diagram, which may or may not be the left and right direction in the normal use state.

It should be noted that, terms "include", "comprise" or any other variants thereof are intended to cover non-exclusive inclusion, so that a process, a method, an article or a device including a series of elements not only includes those elements, but also includes those that are not explicitly listed, or also include elements inherent to the process, the method, the article, or the device. In the case that there are no more limitations, an element defined by the phrase "including a . . . " does not exclude the existence of other same elements in the process, the method, the article, or the device that includes the element. Term “multiple” means greater than or equal to two.

The embodiment of the present disclosure provides a rope replacement apparatus, which is mainly used for rope replacement of a mining hoist (hereinafter referred to as hoist). The shape, structure, composition, etc. of the mining hoist do not limit the structure of the rope replacement apparatus in the embodiment of the present disclosure. According to different application scenarios, the mining hoist may have different conversion forms. It should be known by those skilled in the art that the mining hoist does not have a limiting effect on the rope replacement apparatus in the embodiment of the present disclosure.

As shown in FIG. 1, the rope replacement apparatus includes a rope conveying mechanism 10, a first detection component 20, a second detection component 30, and a control component. The rope conveying mechanism 10 is configured to drive a first rope 50 to move along a moving path of a second rope 61 to replace the second rope 61. Here, the first rope 50 may be a new steel wire rope, and the second rope 61 may be an old steel wire rope.

As shown in FIG. 1, the first detection component 20 is configured to detect a first movement speed $V_1$ of the first rope 50 output by the rope conveying mechanism 10. The first detection component 20 is mounted on the rope conveying mechanism 10. Here, the first movement speed $V_1$ of the first rope 50 is determined by the driving speed and the driving force of the rope conveying mechanism 10. Here, the first detection component 20 is mounted on the rope conveying mechanism 10, in which the specific mounting position of the first detection component is not specified, as long as the first movement speed $V_1$ may be detected.

As shown in FIG. 1, the second detection component 30 is configured to detect a second movement speed $V_2$ of the second rope 61 located outside the rope conveying mechanism 10. The second detection component 30 is mounted on the moving path of the second rope 61. Here, the second movement speed $V_2$ of the second rope 61 is determined by the driving speed and the driving force of the rope using device, for example, may be determined by the driving speed and the driving force of the mining hoist. The second detection component 30 is mounted on the moving path of the second rope 61, in which the specific mounting position of the second detection component is not specified, as long as the second movement speed may be detected. It should be noted that the moving path of the second rope 61 is longer compared to the rope conveying mechanism 10. However, since the second rope and the rope conveying mechanism are both driven by the rope using device, the difference in movement speeds therebetween is not significant and thus can be substantially ignored.

As shown in FIG. 1, the rope using device is a mining hoist. The mining hoist includes a head sheave 62, a first hoisting container 63, a second hoisting container 64, and a second rope 61. One end of the second rope 61 is connected to the first hoisting container 63, and another end of the second rope is connected to the second hoisting container 64 around the head sheave 62. When the mining hoist hoists the first container, the head sheave 62 rotates clockwise, and the second hoisting container 64 descends. Conversely, the head sheave 62 rotates counterclockwise, and the second hoisting container 64 ascends. It may be understood by those skilled in the art that the mining hoist is not limited to the configuration shown in FIG. 1.

The control component (not shown in the figure) is configured to adjust the $V_1$ according to a difference between the $V_1$ and the $V_2$. Since the first movement speed $V_1$ and the second movement speed $V_2$ may not be the same, in this case, it is easy to cause slipping or stalling. Thus, the $V_1$ is adjusted by the control component according to the difference between the $V_1$ and the $V_2$ to allow the speed $V_1$ and the speed $V_2$ as same as possible, so that the problem of slipping or stalling may be reduced. Here, the control component may be a Programmable Logic Controller (PLC).

The first detection component 20 and the second detection component 30 are both in communication connection with the control component. Here, the purpose of the communication connection is to transmit data and control instructions, and the communication medium is not limited, as long as the data may be transmitted and the instructions may be controlled. For example, a wired communication connection or a wireless communication connection may be possible. The wired communication connection may also include a copper medium and an optical fiber medium, while the wireless communication connection is not limited to a protocol method.

The embodiment of the present disclosure provides a rope replacement apparatus, which includes a rope conveying mechanism 10, a first detection component 20, a second detection component 30, and a control component. The first detection component 20 is configured to detect a first movement speed $V_1$ of a first rope 50 output by the rope conveying mechanism 10. The second detection component 30 is configured to detect a second movement speed $V_2$ of a second rope 61 located outside the rope conveying mechanism 10. The control component is configured to adjust the $V_1$ according to a difference between the $V_1$ and the $V_2$. The rope replacement apparatus according to the embodiment of the present disclosure is configured to adjust the first movement speed $V_1$ of the first rope 50 output by the rope conveying mechanism 10 according the difference between the $V_1$ and the $V_2$ by the control component, so that the movement speed of the first rope 50 may match with the movement speed of the second rope located outside the rope conveying mechanism, which may facilitate a smooth replacement of the second rope with the first rope and reduce the slipping phenomenon in the rope replacement process, thereby improving the efficiency of rope replacement, reducing damage to the device and the new ropes, and improving the quality of rope replacement.

Figure 2:
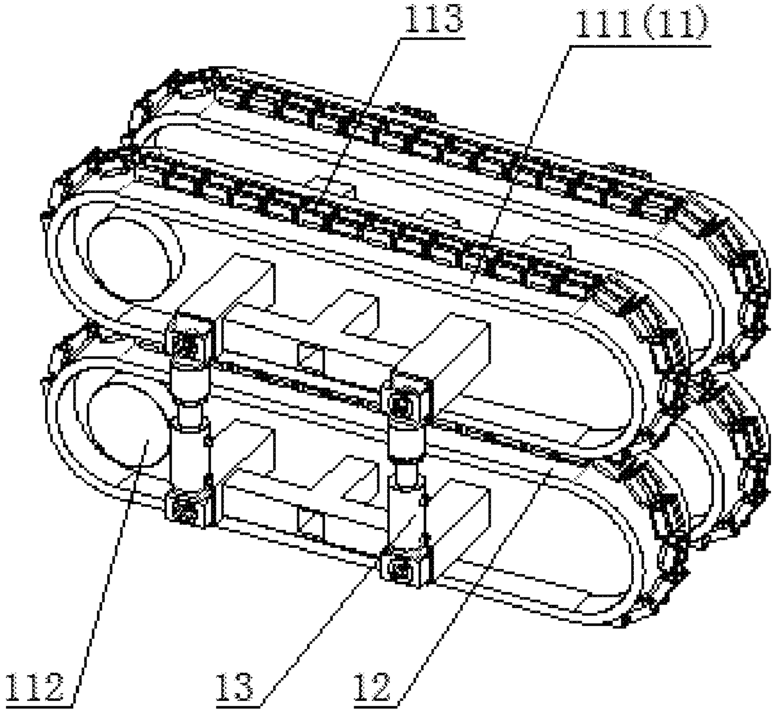
FIG. 2 is a schematic diagram of a first clamping assembly and a second clamping assembly in a rope replacement apparatus according to an embodiment of the present disclosure.

According to an optional embodiment of the present disclosure, as shown in FIG. 2, the rope conveying mechanism 10 includes a first clamping assembly 11, a second clamping assembly 12, and a clamping hydraulic cylinder 13. Each of the first clamping assembly 11 and the second clamping assembly 12 includes a clamping belt 11 configured to clamp the first rope 50, and a driving roller 112 configured to drive the clamping belt 111 into rotation. The clamping belt 111 of the first clamping assembly 11 is provided on one side (an upper side shown in FIG. 2) of the first rope 50, and the clamping belt 111 of the second clamping assembly 12 is provided on another side (a lower side shown in FIG. 2) of the first rope 50, to clamp the first rope 50. The first clamping assembly 11 and the second clamping assembly 12 not only clamp the first rope 50 by the clamping belts 111, but also drive the first rope 50 to move.

Specifically, as shown in FIG. 2, the clamping belt 111 of each of the first clamping assembly 11 and the second clamping assembly 12 is connected end-to-end to form a ring, and the driving roller is provided in an inner ring of the clamping belt 111. In this way, the driving roller rotates to drive the clamping belt into rotation. The rotation of the clamping belts causes a relative movement of the clamping belts relative to the clamped first rope, thereby generating a friction force, which drives the first rope to move. Specifically, a rotation direction of an upper clamping belt is opposite to a rotation direction of a lower clamping belt. For example, the upper clamping belt moves clockwise to generate a leftward friction force on an upper surface of the first rope, and the lower clamping belt moves counterclockwise to generate a leftward friction force on a lower surface of the first rope, so that the first rope is subjected to the two frictional forces to move to the left. Thus, the two clamping belts rotate circularly under the drive of the drive roller 112, so as to continuously drive the first rope to move.

In some embodiments, the drive roller 112 may be driven by a hydraulic motor (not shown in the figure), which has a larger power-to-weight ratio and lower energy consumption compared to a drive device such as an electric motor. Moreover, the drive roller and the clamping hydraulic cylinder 13 may share a set of hydraulic system, thereby avoiding the use of an additional power source device.

Figure 3:
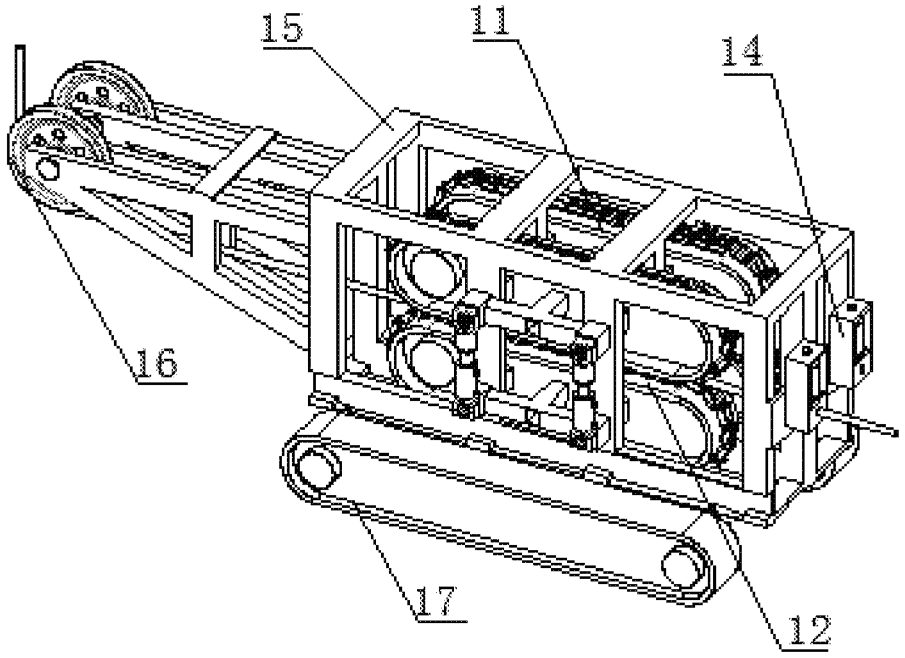
FIG. 3 is a schematic diagram of a rope replacement apparatus according to an embodiment of the present disclosure.
Figure 4:
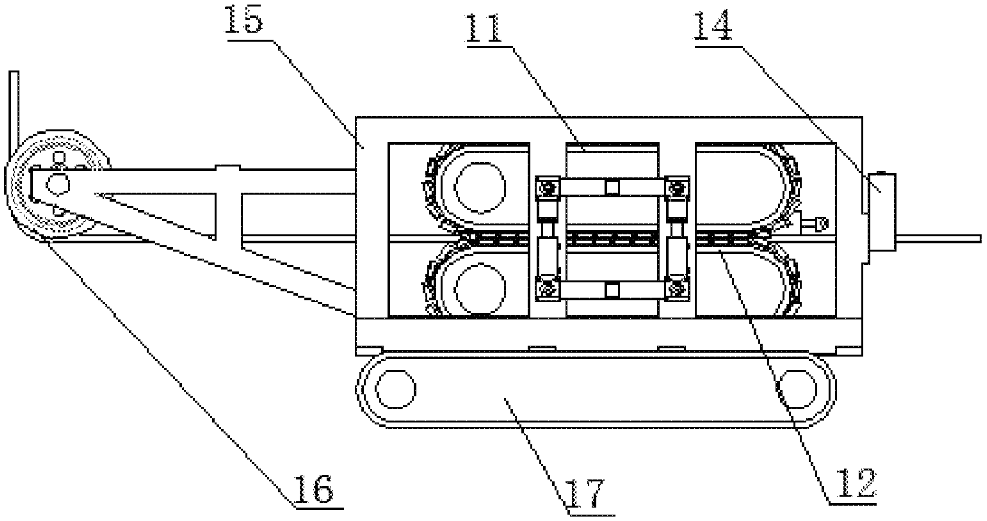
FIG. 4 is a schematic diagram of an orthographic projection of FIG. 3.

As shown in FIG. 3 and FIG. 4, the clamping hydraulic cylinder 13 is connected to the driving roller 112 of the first clamping assembly 11 to drive the clamping belt 111 of the first clamping assembly 11 to move towards the clamping belt 111 of the second clamping assembly 12, to clamp the first rope 50. Here, the clamping hydraulic cylinder 13 drives the clamping belt 111 of the first clamping assembly 11 to move towards the clamping belt 111 of the second clamping assembly 12 through the movement of a piston, so as to clamp the first rope 50. Since the movement of the first clamping assembly 11 towards the second clamping assembly 12 is a linear movement, and the stroke thereof is relatively short, a greater clamping force can be obtained by using the hydraulic cylinder.

In some embodiments, the clamping force of the clamping hydraulic cylinder 13 can be adjusted according to a diameter of the first rope 50. For example, when the diameter of the first rope 50 is relatively large, the clamping hydraulic cylinder 13 may store excess flow rate through an accumulator (not shown in the figure) provided, so as to prevent a significant increase in pressure in a rod chamber of the clamping hydraulic cylinder 13, which may cause damage to the clamping belt 111, the clamping hydraulic cylinder 13, and a hydraulic pipe connected to the rod chamber of the clamping hydraulic cylinder 13. When the diameter of the first rope 50 is relatively small, the clamping hydraulic cylinder 13 may supplement the insufficient flow rate of a hydraulic pump by the flow rate released from the accumulator provided, so as to avoid a decrease in pressure in the rod chamber of the clamping hydraulic cylinder 13, resulting in slipping or sliding of the first rope 50 after the clamping force is reduced.

In some embodiments, as shown in FIG. 2, there are two sets of first clamping assemblies 11, two sets of the second clamping assemblies 12, and two sets of clamping hydraulic cylinders 13. That is, two first ropes 50 may be simultaneously driven to move along the moving paths of two second ropes 61, so as to replace the two second ropes 61. In this way, as for a multi-rope mining hoist, the replacement efficiency is high.

In an optional embodiment of the present disclosure, as shown in FIG. 2, the clamping belt 111 is provided with a plurality of friction blocks 113 distributed in a circumferential direction. Here, the friction blocks 113 may drive the first rope 50 to move by setting a relatively large sliding friction force, so as to achieve the purpose of continuously conveying the first rope 50. For example, the friction block 113 may be made of a material capable of generating a relatively large sliding friction force.

In some embodiments, each of the plurality of friction blocks 113 is provided with a groove for passage of the first rope 50. The groove may be configured to increase an engagement area with the first rope 50, thereby further increasing the sliding friction force. In some embodiments, the shape of the groove may be a semicircle matching with the diameter of the first rope 50. In this way, the groove of the friction block 113 of the first clamping assembly 11 and the groove of the friction block 113 of the second clamping assembly 12 are closed to form one circular groove for clamping the first rope 50.

Figure 5:
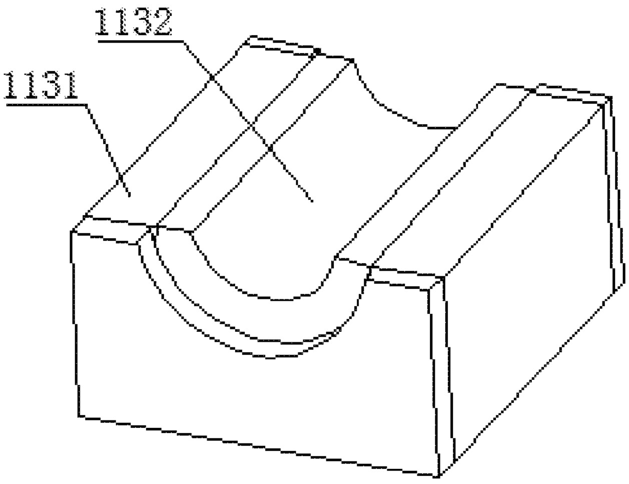
FIG. 5 is a schematic diagram of a friction block in a rope replacement apparatus according to an embodiment of the present disclosure.

According to an optional embodiment of the present disclosure, as shown in FIG. 5, each of the plurality of friction blocks 113 includes a base 1131 and a friction plate 1132. The friction plate 1132 is removably fixed to the base 1131, and the friction plate 1132 is provided with the groove for passage of the first rope 50. That is, the friction plate 1132 can be replaced, so that it may be replaced with a friction plate 1132 provided with a groove with a more suitable size according to the diameter of the first rope 50, thereby adapting to more types of first ropes 50. It may be replaced with a new friction sheet 1132 according to the wear degree of the friction plate 1132, without the need to replace the entire friction plate 113, so that the usage cost is low.

According to an optional embodiment of the present disclosure, as shown in FIG. 3 and FIG. 4, the rope conveying mechanism 10 further includes a brake assembly 14 configured to stop movement of the first rope 50. The brake assembly 14 is independent of the first clamping assembly 11 and the second clamping assembly 12, and a braking force generated by the brake assembly is greater than a driving force generated by the first clamping assembly 11 and the second clamping assembly 12. That is, regardless of whether the first clamping assembly 11 and the second clamping assembly 12 are in operation, the brake assembly 14 may quickly brake the first rope 50 and stop the movement of the first rope 50.

Figure 6:
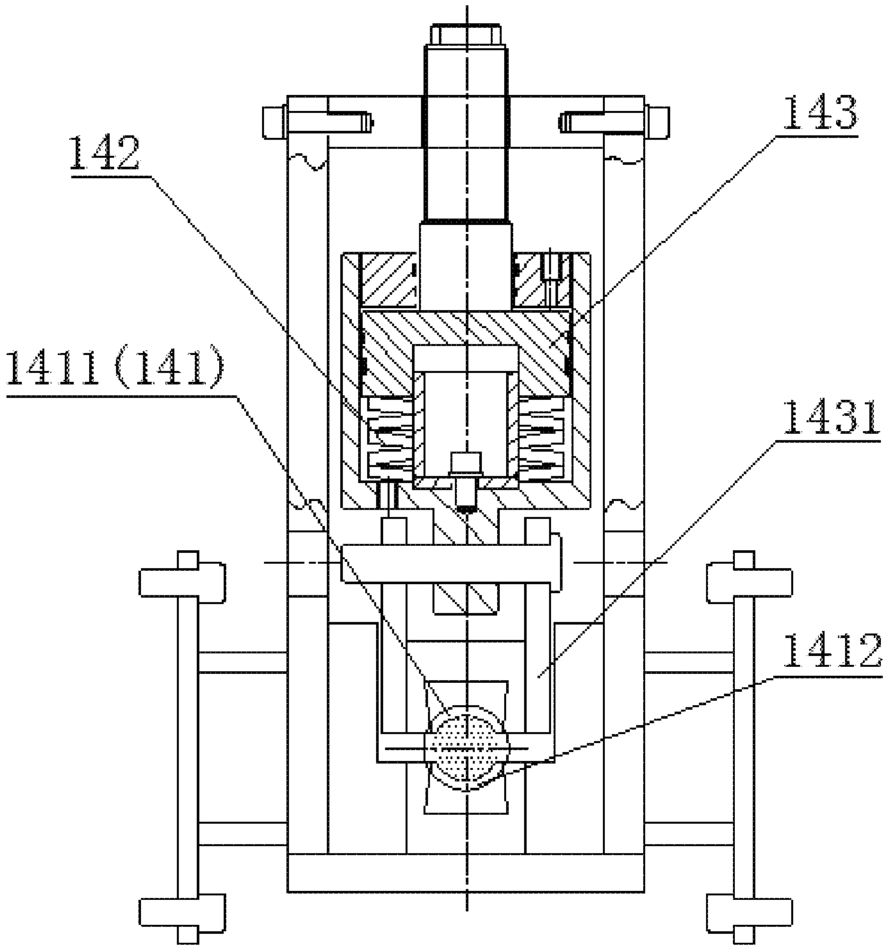
FIG. 6 is a schematic diagram of a brake assembly in a rope replacement apparatus according to an embodiment of the present disclosure.

As shown in FIG. 6, the brake assembly 14 includes brake pads 141, a brake spring 142, and an energy storage hydraulic cylinder 143. There are at least two brake pads 141. The at least two brake pads are located on both sides of the first rope 50 respectively and are configured to close for braking the first rope 50. Here, the brake pads 141 may be made of a material with high friction resistance and good wear resistance. Specifically, the brake pads 141 include an upper brake pad 1411 and a lower brake pad 1412. The upper brake pad 1411 is located on the upper side of the first rope 50, and the lower brake pad 1412 is located on the lower side of the first rope 50.

As shown in FIG. 6, the brake spring 142 is abutted against the upper brake pad 1411 to press the brake pads 141 to close. That is, the brake spring 142 is abutted against the upper brake pad 1411 by an elastic force to close the brake pads 141 for braking. Specifically, the brake spring 142 is indirectly abutted against the upper brake pad 1411 through a piston portion 1431 of the energy storage hydraulic cylinder 143. That is, the brake spring 142 is abutted against the piston portion 1431, and the piston portion 1431 is abutted against the upper brake pad 1411, so that the elastic force of the brake spring 142 may be applied to the upper brake pad 1411 through the piston portion 1431. More specifically, the upper brake pad 1411 is fixed to a lower end of the piston portion 1431, that is, the upper brake pad 1411 and the piston portion 1431 are linked to each other. In some embodiments, the brake spring 142 may be a butterfly spring.

As shown in FIG. 6, the energy storage hydraulic cylinder 143 is configured to separate the brake pads 141 from each other to release the braking, and to compress the brake spring 142 for energy storage. That is, when the rope conveying mechanism 10 is in normal operation, the energy storage hydraulic cylinder 143 is started, and the piston portion 1431 of the energy storage hydraulic cylinder rises (the hydraulic cylinder is set so that the piston portion is positioned in an upper position when the hydraulic cylinder is started), and the upper brake pad 1411 fixed to the piston portion 1431 is driven to rise together, so that the brake pads 141 are separated from each other. Meanwhile, the upward movement of the piston portion 1431 compresses the brake spring 142 arranged above the piston portion 1431, so that the brake spring is in an energy storage state.

When braking is required, the energy storage hydraulic cylinder 143 is closed, so that the piston portion 1431 of the energy storage hydraulic cylinder is in a free state, that is, the piston portion is free from hydraulic control and may freely move upwards and downwards. In this way, the obstruction at a lower end of the brake spring 142 in the energy storage state is removed, and the elastic force of the brake spring 142 acts to drive the piston portion 1431 to move downwards, that is, to drive the upper brake pad 1411 fixed to the piston portion 1431 to move downwards, so that the brake pads 141 are closed to generate a frictional resistance, which is opposite to a movement direction of the first rope 50, to the first rope 50, that is, to brake the first rope 50. Alternatively, when a failure occurs in the rope replacement apparatus, such as a power failure or an oil circuit failure, the energy storage hydraulic cylinder 143 is closed or inactive, so that the first rope 50 is braked under the action of the brake spring 142, thereby avoiding a safety accident.

According to an optional embodiment of the present disclosure, as shown in FIG. 3 and FIG. 4, the rope conveying mechanism 10 further includes a rack 15. The second clamping assembly 12 is fixedly connected to the rack 15, and the first clamping assembly 11 is movably connected to the rack 15. In this way, the relative movement of the first clamping assembly 11 relative to the second clamping assembly 12 may be achieved by the movement of the first clamping assembly 11 relative to the rack 15, thereby achieving the clamping of the first rope 50. It is only necessary to control the movement of the first clamping assembly 11, without simultaneously controlling the movement of the first clamping assembly 11 and the movement of the second clamping assembly 12.

As shown in FIG. 3 and FIG. 4, an extension direction of the rack 15 is consistent with a movement direction of the first rope 50, and the brake assembly 14 is located at any one end in the extension direction of the rack 15. In this way, the brake assembly 14 may be relatively distanced from the first clamping assembly 11 and the second clamping assembly 12, so that the braking process is not disturbed, resulting in a better braking effect.

In some embodiments, the rope conveying mechanism 10 further includes a guide pulley 16. The guide pulley 16 is configured to control a connection angle of the first rope 50 output by the rope conveying mechanism 10 to the hoist. In this way, the first rope 50 will not be greatly bent, and the force on the first rope is more balanced, so that the first rope is not easy to be damaged.

In an optional embodiment of the present disclosure, as shown in FIG. 1, the first detection component 20 includes a first encoder 201 and a first processor, the first encoder and the first processor being in communication connection with each other. The first encoder 201 is configured to detect a first rotational speed $R_1$ of the driving roller 112, and the first processor is configured to convert the first rotational speed $R_1$ measured by the first encoder 201 into the first movement speed $V_1$. Since the drive roller 112 continuously rotates, it is more accurate to detect the rotational speed and then convert it into the movement speed. An encoder is a device that encodes and converts a signal (such as a bit stream) or data into a signal form that can be used for communication, transmission, and storage. In this embodiment, the first encoder 201 acquires angular displacement data, converts it into a communicable signal and sends the communicable signal to the first processor. For example, the angular displacement data is modulated into the communicable signal and sent to the first processor, and the communicable signal is demodulated by the first processor to obtain the angular displacement data. According to the angular displacement data, that is, the first rotational speed $R_1$, the first movement speed $V_1$ is calculated by the first processor, that is, the conversion between an angular speed and a linear speed, which will not be described in detail.

In some embodiments, the first processor may be a server 202 disposed outside the rope replacement apparatus, so that more powerful calculating power can be obtained. The calculation result of the server 202 can be transmitted back to the control component of the rope replacement apparatus, so that the $V_1$ is adjusted by the control component.

According to an optional embodiment of the present disclosure, as shown in FIG. 1, the second detection component 30 includes a second encoder 301 and a second processor, the second encoder and the second processor being in communication connection with each other. The second encoder 301 is configured to detect a second rotational speed $R_2$ of a head sheave 62 on the moving path of the second rope 61, and the second processor is configured to convert the second rotational speed $R_2$ measured by the second encoder 301 into the second movement speed $V_2$. As described above, it is more accurate to detect the rotational speed and then convert it into the movement speed. In some embodiments, the second processor may also be a server 202 disposed outside the rope replacement apparatus. The first processor and the second processor may be the same server.

According to an optional embodiment of the present disclosure, as shown in FIG. 3 and FIG. 4, the rope conveying mechanism 10 further includes a crawler travelling mechanism 17. The crawler travelling mechanism 17 is mounted below the rack 15, and is configured to adjust a distance between the rope conveying mechanism 10 and a hoist. The crawler travelling mechanism 17 may support the relatively large weight of the rope conveying mechanism 10, and is more suitable for the ground of the mining area compared to the roller-type movement.

According to an optional embodiment of the present disclosure, the first encoder 201 is in wireless communication connection with the first processor, and the first processor is in wireless communication connection with the control component. The second encoder 301 is in wireless communication connection with the second processor, and the second processor is in wireless communication connection with the control component. In some embodiments, the wireless communication network may be bluetooth, Wireless Fidelity (Wi-Fi), or zigbee. That is, the first encoder 201, the first processor, the control component, the second encoder 301, and the second processor each may be provided with a corresponding wireless communication module.

Figure 7:
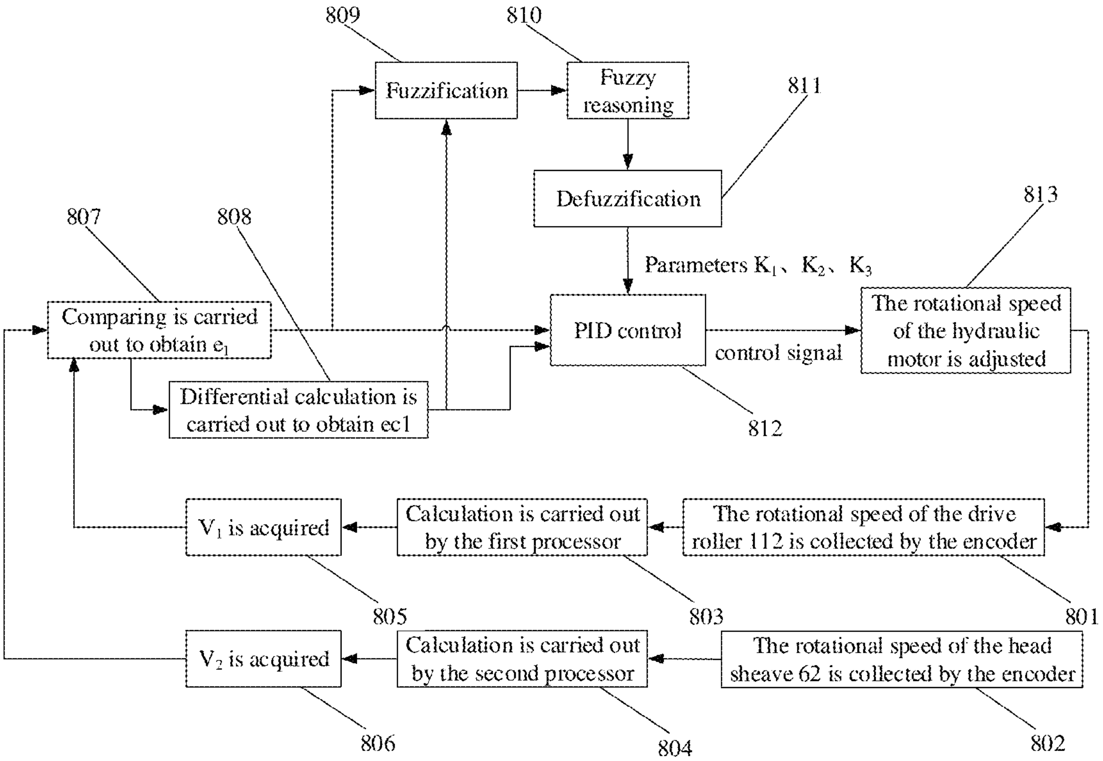
FIG. 7 is a flow chart of adjustment of a movement speed of a rope in a rope replacement apparatus according to an embodiment of the present disclosure.

In order to understand in detail the adjusting process of the first movement speed $V_1$ by the control component, further introduction will be described below. As shown in FIG. 7, the adjusting process includes the following operations.

801: The rotational speed of the drive roller 112 is collected by the encoder. That is, the angular displacement data of the drive roller 112 is acquired by the first encoder 201 and is sent to the first processor.

802: The rotational speed of the head sheave 62 is collected by the encoder. That is, the angular displacement data of the head sheave 62 is acquired by the second encoder 301, and is sent to the second processor.

803: Calculation is carried out by the first processor. That is, the angular speed of the drive roller 112 is calculated by the first processor as the linear speed.

804: Calculation is carried out by the second processor. That is, the angular speed of the head sheave 62 is calculated by the second processor as the linear speed.

805: $V_1$ is acquired. That is, the first movement speed $V_1$ of the first rope 50 output by the rope conveying mechanism 10 is acquired.

806: $V_2$ is acquired. That is, the second movement speed $V_2$ of the second rope 61 located outside the rope conveying mechanism 10 is acquired.

807: Comparing is carried out to obtain $e_1$. The $e_1$ is the difference between $V_1$ and $V_2$.

808: Differential calculation is carried out to obtain $ec_1$. The $ec_1$ is the rate of change in $e_1$ and is obtained by differential calculation.

809: Fuzzification is implemented. The determined value of the input is converted into the corresponding fuzzy language variable value to facilitate the next fuzzy reasoning.

810: Fuzzy reasoning is implemented. Fuzzy reasoning simulates the thinking process of human beings, and draws possible imprecise conclusions from imprecise premise sets. Due to the reasons such as rope slipping and load change, the detection values of $V_1$ and $V_2$ are not necessarily accurate. Thus, fuzzy reasoning is introduced to make the relevant data more reasonable.

811: Defuzzification is implemented. Defuzzification converts the inferred fuzzy value into a clear control signal, which is used as the input value for the next PID control. In this embodiment, the result of defuzzing is to obtain three adjustment parameters $K_1$, $K_2$, $K_3$.

812: PID control is implemented. PID control, also known as proportional-integral-derivative control, is an industrial closed-loop feedback control. PID control is a control method that is widely used in industry, more mature and effective, which will not be described in detail. In this embodiment, PID control is implemented by a PLC controller. The PLC controller outputs the control signal for adjusting the rotational speed of the hydraulic motor, according to $e_1$ and $ec_1$, combine with the parameters $K_1$, $K_2$, $K_3$. The adjustment aims to reduce $e_1$ and $ec_1$. Here, PID control is a dynamic control and a continuous control. It can be understood that, adjusting the first movement speed $V_1$ of the first rope 50 through PID control may achieve better results. However, it is also feasible to adjust the first movement speed $V_1$ based solely on the arithmetic difference between the first movement speed $V_1$ and the second movement speed $V_2$, if PID control is not used. 813: The rotational speed of the hydraulic motor is adjusted. According to the received control signal for adjusting the rotational speed of the hydraulic motor, the rotational speed of the hydraulic motor is adjusted, and then the first movement speed $V_1$ of the first rope 50 output by the rope conveying mechanism 10 is adjusted.

The above only describes the preferred embodiments of the present disclosure, and is not intended to limit the protection scope of the present disclosure. Any modifications, equivalent substitution, improvements made within the spirit and principle of the present disclosure shall be contained within the protection scope of the present disclosure.

The invention claimed is:

1. A rope replacement apparatus, comprising:

a rope conveying mechanism, wherein the rope conveying mechanism is configured to drive a first rope to move along a moving path of a second rope to replace the second rope;

a first detection component, wherein the first detection component is configured to detect a first movement speed $V_1$ of the first rope output by the rope conveying mechanism, and the first detection component is mounted on the rope conveying mechanism; the first movement speed $V_1$ is determined by a driving speed and a driving force of the rope conveying mechanism;

a second detection component, wherein the second detection component is configured to detect a second movement speed $V_2$ of the second rope located outside the rope conveying mechanism, and the second detection component is mounted on the moving path of the second rope; the second movement speed $V_2$ is determined by the driving speed and the driving force of the rope conveying mechanism; and a control component, wherein the control component is configured to adjust the first movement speed $V_1$ according to a difference between the first movement speed $V_1$ and the second movement speed $V_2$, such that the first movement speed $V_1$ matches with the second movement speed $V_2$, and each of the first detection component and the second detection component is in communication connection with the control component;

wherein the rope conveying mechanism comprises:

a first clamping assembly and a second clamping assembly, wherein each of the first clamping assembly and the second clamping assembly comprises a clamping belt configured to clamp the first rope, and a driving roller configured to drive the clamping belt into rotation, wherein the clamping belt of the first clamping assembly is provided on one side of the first rope, and the clamping belt of the second clamping assembly is provided on another side of the first rope, to clamp the first rope; and a clamping hydraulic cylinder, wherein the clamping hydraulic cylinder is connected to the driving roller of the first clamping assembly to drive the clamping belt of the first clamping assembly to move towards the clamping belt of the second clamping assembly, to clamp the first rope;

wherein the clamping belt is provided with a plurality of friction blocks distributed in a circumferential direction, wherein each of the plurality of friction blocks is provided with a groove for passage of the first rope.

2. The rope replacement apparatus according to claim 1, wherein each of the plurality of friction blocks comprises a base and a friction plate, wherein the friction plate is removably fixed to the base, and the friction plate is provided with the groove for passage of the first rope.

3. The rope replacement apparatus according to claim 1, wherein the rope conveying mechanism further comprises a brake assembly configured to stop movement of the first rope, wherein the brake assembly comprises:

at least two brake pads, wherein the at least two brake pads are located on both sides of the first rope and are configured to close for braking the first rope;

a brake spring, wherein the brake spring is abutted against a respective one of the at least two brake pads to press the at least two brake pads to close; and an energy storage hydraulic cylinder, wherein the energy storage hydraulic cylinder is configured to separate the at least two brake pads from each other to release the braking, and to compress the brake spring for energy storage.

4. The rope replacement apparatus according to claim 3, wherein the rope conveying mechanism further comprises:

a rack, wherein the second clamping assembly is fixedly connected to the rack, and the first clamping assembly is movably connected to the rack;

wherein an extension direction of the rack is consistent with a movement direction of the first rope, and the brake assembly is located at any one end in the extension direction of the rack.

5. The rope replacement apparatus according to claim 4, wherein the rope conveying mechanism further comprises a crawler travelling mechanism, wherein the crawler travelling mechanism is mounted below the rack, and is configured to adjust a distance between the rope conveying mechanism and a hoist.

6. The rope replacement apparatus according to claim 1, wherein the first detection component comprises a first encoder and a first processor, the first encoder and the first processor being in communication connection with each other, wherein the first encoder is configured to detect a first rotational speed $R_1$ of the driving roller, and the first processor is configured to convert the first rotational speed $R_1$ measured by the first encoder into the first movement speed $V_1$.

7. The rope replacement apparatus according to claim 6, wherein the second detection component comprises a second encoder and a second processor, the second encoder and the second processor being in communication connection with each other, wherein the second encoder is configured to detect a second rotational speed $R_2$ of a head sheave on the moving path of the second rope, and the second processor is configured to convert the second rotational speed $R_2$ measured by the second encoder into the second movement speed $V_2$.

8. The rope replacement apparatus according to claim 7, wherein the first encoder is in wireless communication connection with the first processor, and the first processor is in wireless communication connection with the control component; and wherein the second encoder is in wireless communication connection with the second processor, and the second processor is in wireless communication connection with the control component.

* * * * *